R. R. McGREGOR.
Seed Planter.
No. 86,992.
Patented Feb. 16, 1869.
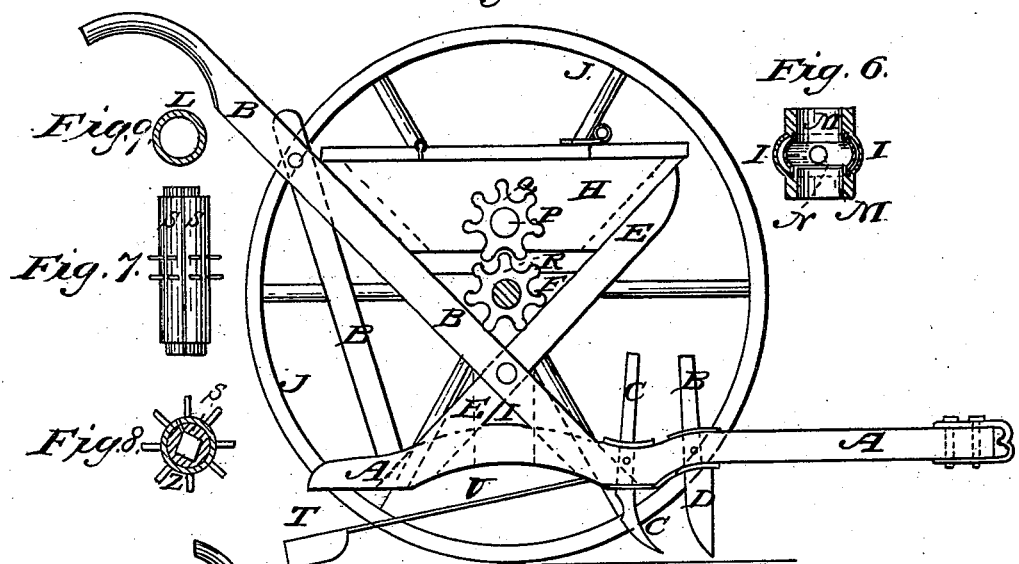
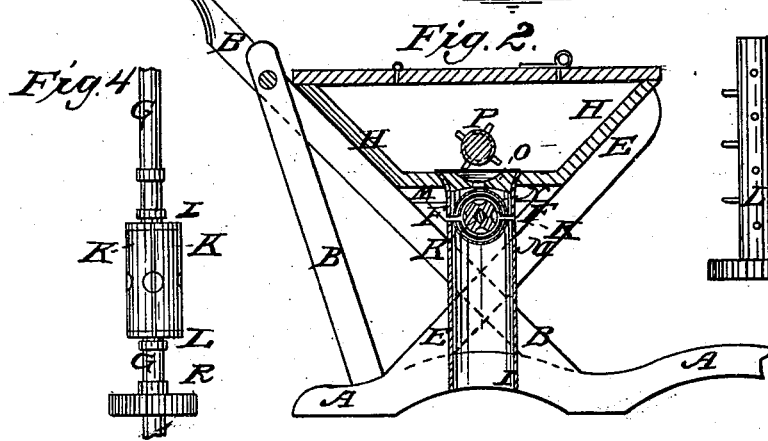
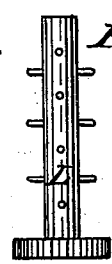
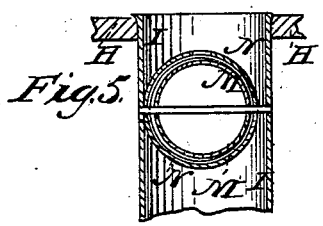
WITNESSES
INVENTOR
R. R. McGregor
per Munn & Co.

R. R. McGREGOR, OF COVINGTON, TENNESSEE.

Letters Patent No. 86,992, dated February 16, 1869.

---

IMPROVEMENT IN CORN AND COTTON-SEED PLANTER

---

The Schedule referred to in these Letters Patent and making part of the same.

---

*To all whom it may concern:*

Be it known that I, R. R. McGREGOR, of Covington, in the county of Tipton, and State of Tennessee, have invented a new and useful Improvement in Corn and Cotton-Seed Planters; and I do hereby declare that the following is a full, clear, and exact description thereof, which will enable others skilled in the art to make and use the same, reference being had to the accompanying drawings, forming part of this specification, in which—

Figure 1 is a side view of my improved planter.

Figure 2 is a vertical section of the same.

Figure 3 is a detail view of the stirring-cylinder.

Figure 4 is a detail view of the corn-dropping device.

Figure 5 is a detail sectional view of the casing and conductor-spout.

Figure 6 is a detail sectional view of the casing, showing the removable slide.

Figure 7 is a detail side view of the cotton-seed dropper.

Figure 8 is an end view of the same.

Figure 9 is a detail view of one of the end-bands.

Similar letters of reference indicate like parts.

My invention has for its object to furnish a simple, convenient, and reliable machine for planting corn and cotton-seed, which shall be so constructed and arranged, that it may be easily adjusted to plant corn or cotton-seed, and which will do its work accurately and well in either capacity; and It consists in the construction and combination of the various parts of the machine, as hereinafter more fully described.

A is the plow-beam, and

B are the handles, which are made and connected with each other in the manner of an ordinary plow.

C is the plow, that opens the furrow to receive the seed, and the standard of which is passed up through a mortise in the beam A, where it is adjustably secured in place by a set-screw.

D is the cutter, which opens the way for the plow C, in front of which it is placed, and the shank of which passes through a mortise in the beam A, where it is adjustably secured in place by a set-screw.

E are the bars, or beams, the rear ends of which are secured to the rear part of the beam A.

The front parts of the bars E incline forward and outward, and are attached to the handles B, so as to form, in connection with said handles, a frame, somewhat in the form of a hopper-shaped saw-buck.

In the upper angle of the frame B E, is placed an angular box, F, in which are placed the bearings for the axle G, and which, at the same time, forms a seat for the seed-hopper H.

I is a spout, by which the seed is conveyed from the dropping-device to the ground, and which passes down through a hole formed in the box F, to which box it is securely attached.

J are the wheels, which are rigidly attached to the axle G, so as to carry the said axle with them in their revolution.

The part of the axle G that passes through the box F, is made square, and upon it is placed the semi-cylindrical blocks K, which, when placed together, form a cylinder, and the plane faces of which are grooved longitudinally, to fit upon the squared middle part of the axle G, to which they are secured by the bands L, slipped upon their ends, so as to be carried around with and by the axle G, in its revolution.

In the faces of the blocks K are formed recesses, or cavities, of such a size as to contain the exact amount of seed required for a hill, and the number of which depends upon the required distances apart of said hills.

M is a cylindrical casing, fitting upon the dropping-blocks K, and which is made in two semi-cylindrical parts, the lower one of which is attached to the spout I, or box F, below the blocks K, and the upper one of which is connected with the hopper H, so as to be removed with said hopper.

The semi-cylindrical parts of the casing M, have transverse slots formed in them, which are closed by the slides N, having holes formed in their middle parts, as shown in figs. 2, 5, and 6.

The slides N are used when corn is to be planted, but are removed when the machine is to be used for planting cotton-seed.

In the bottom of the hopper H, is formed a slot, corresponding, in size, form, and position, with the slot in the upper part of the casing M.

In planting cotton-seed, this slot is left open, but in planting corn, it is closed by the cup O fitting into it, and having a hole formed in its bottom for the passage of the corn, said hole corresponding, in size, form, and position, with the hole in the upper slide N.

P is a shaft, passing through and working in bearings in the sides of the hopper H, and which is provided with a series of projecting fingers, so as, by its revolution, to keep the seed in the hopper stirred up, causing it to pass freely through the opening in the bottom of said hopper.

To the projecting end of the shaft P, is attached a gear or finger-wheel, Q, the teeth of which mesh into the teeth of the gear or finger-wheel R, attached to the axle G, so that the stirrer-shaft P may be operated by the advance of the machine.

S are the semi-cylindrical blocks, made, and secured to the axle G, in the same manner as the blocks K, except that, instead of having recesses formed in their faces, they have rows of projecting pins or fingers attached to them, as shown in figs. 7 and 8, which, when the slides N and cup O are removed, take hold of the cotton-seed, and carry it to the slot in the lower part of the casing M, through which it drops into the conductor-spout I, the cotton-seed being thus dropped in charges, or hills, at a little distance apart.

T is the covering-block, the lower side of which is hollowed out, in the ordinary manner, according to the desired form to be given to the ridge.

The block T is connected with the plow-beam A, by the elastic or spring-bars U, the rear ends of which are attached to the block T, near its ends, and the forward ends of which are attached to the beam A, as shown in fig. 1.

The spring-connections U allow the block T to rise, to pass over obstructions, and, at the same time, hold the said block T down upon the ground with the requisite pressure.

Having thus described my invention,

I claim as new, and desire to secure by Letters Patent—

1. The combination and arrangement of the beam A, handles B, bars E, box F, hopper H, revolving axle G, and wheels J, with each other, substantially as herein shown and described, and for the purpose set forth.

2. The semi-cylindrical dropping-blocks K and S. either or both, constructed and attached to the axle G, substantially as herein shown and described, and for the purpose set forth.

3. The casing M, constructed substantially as described, and provided with detachable perforated slides N, in combination with the hopper H, spout I, and semi-cylindrical dropping-blocks K and S, either or both, as and for the purpose set forth.

4. The detachable perforated cup O, in combination with the slotted bottom of the hopper H, and slotted casing M, and detachable slides N, substantially as herein shown and described, and for the purpose set forth.

The above specification of my invention signed by me, this 10th day of October, 1868.

R. R. McGREGOR.

Witnesses:
  W. G. BLACK,
  W. G. PAYNE.